March 16, 1965  P. SCHIERSE ETAL  3,173,356
SAFETY AIR VALVE FOR AIR RAID SHELTERS
Filed April 2, 1963  3 Sheets-Sheet 1

INVENTORS
Paul Schierse
Günter Franke
BY Bailey, Stephens & Huettig
ATTORNEYS

March 16, 1965 P. SCHIERSE ETAL 3,173,356
SAFETY AIR VALVE FOR AIR RAID SHELTERS
Filed April 2, 1963 3 Sheets-Sheet 2

INVENTORS
Paul Schierse
Günter Franke
BY Bailey, Stephens & Huettig
ATTORNEYS

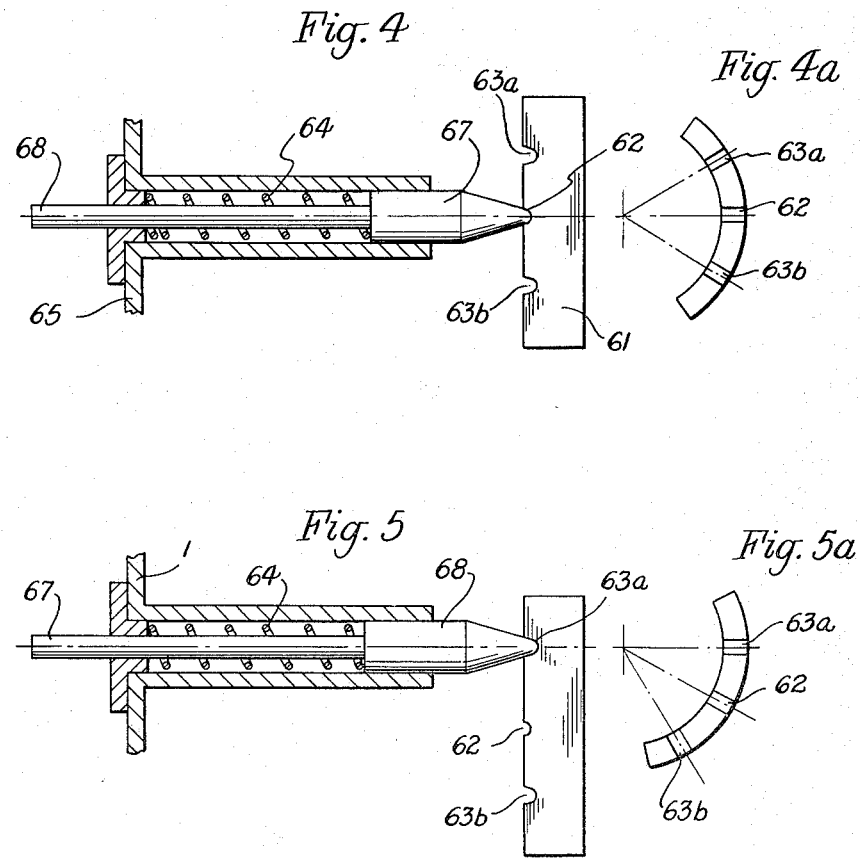

United States Patent Office 3,173,356
Patented Mar. 16, 1965

3,173,356
SAFETY AIR VALVE FOR AIR RAID SHELTERS
Paul Schierse and Günter Fianke, Lubeck, Germany, assignors to Ewers & Miesner Hartgusswerk und Maschinenfabrik G.m.b.H., Lubeck, Germany
Filed Apr. 2, 1963, Ser. No. 270,014
Claims priority, application Germany, June 19, 1962, E 23,057
7 Claims. (Cl. 98—119)

This invention relates to a safety air valve for an air raid shelter.

Our copending application S.N. 143,804, filed October 9, 1961, for "Air Duct Valve for Shelter," now Patent No. 3,139,811, dated July 7, 1964, discloses a valve device for providing safety against air pressure waves and/or suction waves such as produced by a bomb explosion. In this device, two valve heads or the like are mounted on a two-armed balance beam to balance the same and to be easily movable. The respective valve seats are positioned in the air intake or exhaust pipe so that one of the valve heads closes upon an increase in the air pressure outside the shelter, and the other valve head closes when the outside air pressure drops to produce a suction. The valve heads are so mounted that in their normal operating position, as that of a balanced scale beam, the air can flow through the valve in a substantially straight line and over a diameter of more than half of the air duct. Also, the valve heads when in balanced position have their upper edges not extending beyond the center line of the air duct. Two of these devices are used for an air raid shelter and each device has two valve heads. One device is located in the fresh air intake duct for the shelter, while the second device is placed in the air exhaust duct.

One feature in the foregoing disclosure is in that the axis of the balance beam lies on the center line of the air duct. Also, the valve ends in the balanced position of the beam extend vertically.

Another feature of the foregoing disclosure is in that one of the valve heads can be overweighted so that, when the valve is in non-operating position, one valve head just closes the air duct while the other valve head is brought into its optimum opening position during normal air flow and held in this position. It thus simultaneously performs the function of a greater than atmospheric pressure valve and an under-atmospheric pressure valve.

The aforesaid application also discloses a manhole in the housing for the valve and a cover plate for the same.

In the aforesaid disclosure, there is provided a quick closure element which acts on the balance beam or on a valve head itself and which is manually actuated exteriorly of the housing by means of a lever for forcing a valve head against its seat and locking it in that position. Also, the shaft holding the element is used as the bearing for the balance beam which is held lightly with little friction and is kept from slipping by means of positioning rings. This shaft is actuated by the lever for seating one of the valve heads.

A further feature in the prior disclosure is the use of a second shaft mounted in the housing to which is fastened a closure arm for actuating one of the valve heads or the balance beam. In all cases, it is expedient to provide a pressure element for the rapid seating of the valve head in its seated position and in which the pressure element is spring-locked into position. Means are also provided for automatically locking the closure arm into position, as by means of a notch on the balance beam.

This invention is an improvement upon the disclosure of the aforesaid application in which the two valve seats extend approximately at right angles to one another and the balance beam is arranged so that its center of gravity is slightly adjacent the pivot point of the balance beam on the side toward that valve head which closes upon a rise in atmospheric pressure. The balance beam is normally held in its open position by locking device means, such as a spring-pressed detent, a rocker arm or the like. This invention has the advantage in that it can be used as an elbow in an air duct and has the further advantage in that a turning force always exists in the direction for the closing of the valve. However, to make sure that the valve is not always in closed position, a locking device is provided such as a spring-pressed detent, rocker arm, or the like, which keeps the valve in its middle open position with both valve heads unseated. Consequently, only a very small air pressure change is needed in order to move the valve heads out of their middle position.

The means by which these and other objects of the invention are obtained are described more fully with reference to the accompanying drawings in which:

FIGURE 4 is an enlarged cross-sectional view of a detail as taken on the line 4—4 of FIGURE 2;

FIGURE 4a is a side view of a portion of detail of FIGURE 4;

FIGURE 5 is a view similar to FIGURE 4 with the parts shown in a different position; and FIGURE 5a is a view similar to FIGURE 4a with a detail in a different position.

Figure 1:
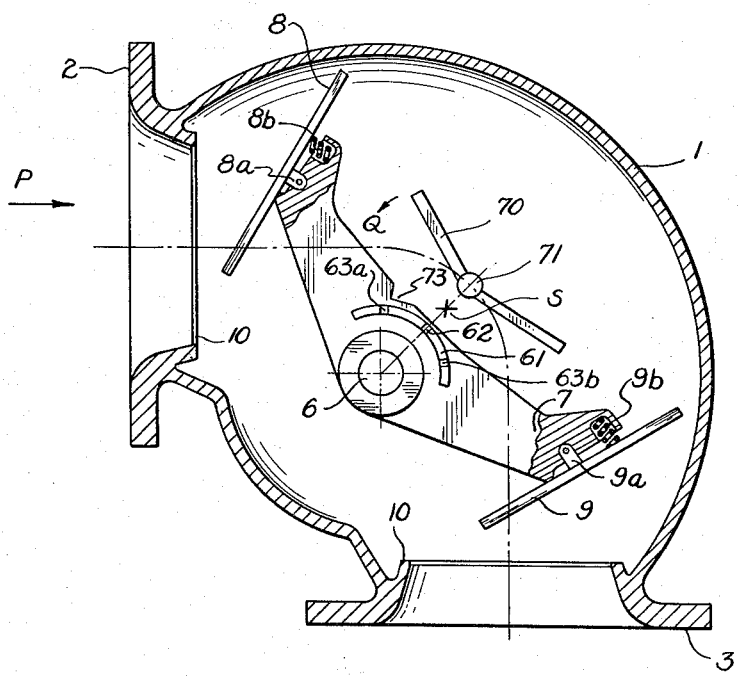
FIGURE 1 is a vertical cross-sectional view through the valve of this invention.
Figure 2:
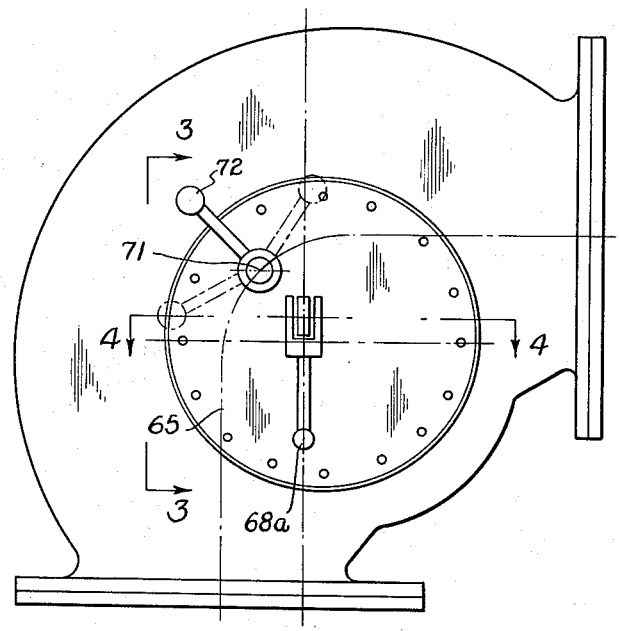
FIGURE 2 is a side elevational view of the valve.
Figure 3:
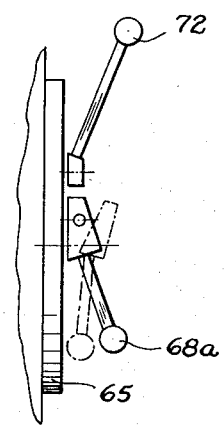
FIGURE 3 is a cross-sectional view of a detail as taken on the line 3—3 of FIGURE 2.

The air pressure and safety device of this invention is composed of a housing 1 having flanges 2 and 3, respectively, for attachment to an air duct. Mounted in housing 1 is a shaft 6 carrying a two-armed balance beam 7 to the ends of which are secured valve heads 8 and 9 by means of pivoted joints 8a and 9a, respectively. The valve heads are urged constantly by means of springs 8b and 9b, respectively, mounted in depressions on the ends of the beam 7 in a direction for seating the valve heads on their respective valve seats 10.

To one side of beam 7 is fastened a curved segment 61 having three stop notches 62, 63a and 63b. As shown in FIGURES 1 and 4, a spring 64 mounted in a sleeve fixed to a cover plate 65 urges the pointed end 67 of a push rod 68 into engagement with notch 62. This holds the beam and valve heads in the position shown in FIGURE 1.

A movable lever 68a is attached to the end of rod 68 exteriorly of the cover 65 so that the rod end 67 can be disengaged from notch 62 and the beam made freely swingable.

The center of gravity S of beam 7, together with the valve heads, is shown in FIGURE 1 at x. This position is deliberately shown at an exaggerated distance from the axis of shaft 6 in order to not confuse the drawings. This center of gravity S lies adjacent the pivot point of the beam toward the valve head which closes upon a rise in the outside atmospheric air pressure. Thus, for example, it is assumed that flange 2 is connected to the fresh air intake into the shelter, while flange 3 leads into the interior of the shelter. Upon an increase in air pressure or shock wave in the direction of the arrow P, valve head 9 seats and closes the valve. This closing is accelerated because the entire valve is constructed so as to produce a turning force which acts in the direction for seating valve head 9. This force is resisted by the spring-pressed rod head 68 engaging notch 62 in the normal open position of the valve.

The additional stop notches 63a and 63b are provided for holding the valve in other positions. Consequently, these notches are formed so that the rod end 67 will become disengaged by forces acting on valve heads 8 and 9, while notch 62 is shaped so that the rod 68 will become disengaged from the notch by a light force acting in one direction.

In order to disengage the rod end 67 from notches 63a or 63b, lever 68a is manually actuated, it being understood that other mechanical or electrical means may also be used.

Other means can be used for this beam locking device, such as a rocker arm, a spring-pressed detent, or the like, which will hold the beam 7 in its normal open position and will release it under a predetermined force.

A spring can also be used for constantly urging the beam back into its normal open position as shown in FIGURE 1.

A two-arm lever 70 is carried on a shaft 71 rotatably mounted in the housing and extending outwardly thereof for manual actuation by a handle 72. Electrical or mechanical means can be substituted for manual operation. When the lever arm is moved in the direction of the arrow Q, it contacts beam 7 and forces valve head 8 against its seat 10. A lock notch 73 in the edge of beam 7 is finally engaged by the end of the arm in order to firmly lock the valve in seated position.

Having now described the means by which the objects of the invention are obtained,

We claim:

1. An air duct safety valve for a shelter subject to air pressure variations comprising an elbow-shaped housing having an atmospheric air inlet opening and an air outlet opening for facing the interior of the shelter, a valve seat in each opening, respectively, with the valve seat in one opening positioned substantially at a right angle to the valve seat in the other opening, respectively, a balance beam having two beam arms inclined at an angle to each other, means pivotally mounting said beam in said housing, an air inlet valve head for the air inlet valve seat, an air outlet valve head for the air outlet valve seat, means pivotally mounting each valve head, respectively, at the ends of said beam arms, said balance beam having its center of gravity adjacent the pivot point of said beam on the side of said outlet valve head for holding each valve head off of its respective seat in the normal open position of the valve and for closing the outlet valve head upon a rise in the atmospheric air pressure, and locking device means for holding said beam in valve open position.

2. A valve as in claim 1, said locking device means comprising a curved segment member centered on the pivot point of said beam and swingable with said beam, stop notches in said segment, and a push rod mounted in said housing and selectively engageable with each of said notches.

3. A valve as in claim 2, spring means for urging said push rod into the notch with which it is engaged.

4. A valve as in claim 3, said push rod extending through said housing, and a handle attached to said push rod for manually disengaging said push rod from a notch.

5. A valve as in claim 4, further comprising a shaft rotatably mounted in said housing, a two-arm lever secured to said shaft adjacent said balance beam, and manual means for turning said shaft to bring one or the other of the lever arms to bear against said beam for opening or closing said valve.

6. A valve as in claim 5, further comprising a locking notch on said balance beam engageable with one of said lever arms for locking said valve in closed position.

7. A valve as in claim 6, said means for pivotally mounting each valve head comprising pivot joints securing each valve head, respectively, to said beam arms, and spring means carried by said beam arms for urging each valve head into valve head seating position.

References Cited by the Examiner
UNITED STATES PATENTS
2,017,033  10/35  McGuffin _____ 137—527.4

ROBERT A. O'LEARY, *Primary Examiner.*